US009343078B2

(12) United States Patent
Lim et al.

(10) Patent No.: US 9,343,078 B2
(45) Date of Patent: May 17, 2016

(54) PRE-PROCESS (AMPLITUDE DISTORTION) AND POST-PROCESS (PHASE SYNCHRONIZATION) FOR LINEAR AEC SYSTEM

(75) Inventors: Meoung-Jin Lim, San Diego, CA (US); Sanghyun Chi, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 13/345,990

(22) Filed: Jan. 9, 2012

(65) Prior Publication Data

US 2013/0177162 A1 Jul. 11, 2013

(51) Int. Cl.
*H04B 3/20* (2006.01)
*G10L 21/0208* (2013.01)

(52) U.S. Cl.
CPC ... *G10L 21/0208* (2013.01); *G10L 2021/02082* (2013.01)

(58) Field of Classification Search
CPC ... H04M 9/082; H04B 3/232; G10L 21/0208; G10L 2021/02082
USPC ......... 381/66, 83, 93, 94.1, 94.8, 95, 96, 318; 379/406.01
See application file for complete search history.

(56) References Cited

U.S. PATENT DOCUMENTS 5,680,450 A * 10/1997 Dent ..................... H04M 9/082 379/388.02
2007/0291636 A1* 12/2007 Rajagopal ............. H04B 1/719 370/208
2010/0184487 A1* 7/2010 Takada ..................... H04R 3/00 455/569.1
2010/0226492 A1* 9/2010 Takada .................. H04M 9/082 379/406.08
2013/0163748 A1* 6/2013 Khanduri .............. H04M 9/082 379/406.08

FOREIGN PATENT DOCUMENTS

CN 1176034 A 10/2001

* cited by examiner

*Primary Examiner* — Vivian Chin
*Assistant Examiner* — William A Jerez Lora
(74) *Attorney, Agent, or Firm* — Schiff Hardin LLP

(57) ABSTRACT

An acoustic processing apparatus is provided. The apparatus includes a pre-processing component, a filter and a first signal processing component. The pre-processing component compensates a non-linearity of a reference signal to generate an input signal. The filter coupled to the pre-processing component, the filter executes filtering on the input signal to generate an output signal. The first signal processing component, coupled to the pre-processing component, the reference signal obtains a gain from the first signal processing component to generate a first signal, and the first signal processing component passes the gain to the pre-processing component.

21 Claims, 3 Drawing Sheets

ECHO PATH COMPENSATION APPARATUS FOR ACOUSTIC ECHO CANCELLATION

NEAR END ACOUSTIC ECHO

CONVENTIONAL ACOUSTIC ECHO CANCELLATION

*ECHO PATH COMPENSATION APPARATUS FOR ACOUSTIC ECHO CANCELLATION*

PRE-PROCESS (AMPLITUDE DISTORTION) AND POST-PROCESS (PHASE SYNCHRONIZATION) FOR LINEAR AEC SYSTEM

BACKGROUND OF THE INVENTION

1. Field of the Invention

This invention relates in general to the field of cellular telecommunications, and more particularly to an echo path compensation technique for use in an acoustic echo cancellation mechanism.

2. Description of the Related Art

Virtually all present day two-way communication devices, such as cell phones and the like, employ some forms of acoustic echo cancellation techniques and mechanisms therein to preclude unwanted echo from being transmitted back to a calling party. Particularly when these devices are used in a loudspeaker mode, the volume of their speaker is turned up so loudly that sound intended only for the receiving party is picked up by the microphone of the receiving device and is transmitted back to the calling party. This phenomena is known as near end acoustic echo and it is desirable to detect and cancel it out because optimally the only sound a calling party should hear coming from his/her speaker is that of the receiving party, not an echo of his/her voice.

Near end acoustic echo cancellation techniques abound, but most rely predominantly on using linear adaptive filters to dynamically and recursively model an echo path, that is the electro-mechanical-acoustic path which a received signal propagates when it is played out of the loudspeaker of a device and enters back in through the device's microphone. Ideally, the echo signal is filtered out and only sound produced by the near end party is allowed to be transmitted back to the far end party.

However, as one skilled in the art will appreciate, an adaptive linear filter is most effective when it is employed to model a system component (i.e., the echo path) that is linear, and there are several elements in the echo patch of any communication device that are not linear such as the speaker and microphone themselves, battery powered amplifiers, etc. Hence, to provide for acoustic echo cancellation by employing an adaptive linear filter exclusively results in residual echo that is transmitted back to the far end party. This is undesirable.

In U.S. Patent Application Publication US20050249349 Derkx et al. propose an echo canceller which has dedicated non stationary echo canceling properties comprising an adaptive filter followed by a residual echo processor that includes a dedicated non stationary echo canceller. Such a technique, while improving upon that which had theretofore been provided, deals only with residual echo from a stochastic systems point of view and thus does not consider known non-linear effects of its host platform.

In U.S. Patent Application Publication US20100189274, Thaden et al. propose a method suitable for coping with non-linear echo paths during acoustic echo cancellation in speakerphones. The method combines a linear adaptive filter and a post-processor together with a multiple microphone approach using beam forming which separately removes the non-linear part of the echo. The approach, which utilizes generalized side lobe cancellation principles to deal with residual non-linear echo components, requires the addition of multiple microphones and multiple beam forming units, thus significantly adding to the overall cost of a communication device.

Therefore, what is needed is a near end acoustic echo cancellation apparatus and method that compensates for non-linear elements within an echo path in a communication device, without the substantial cost of additional components such as microphones.

Additionally, what is needed is a acoustic echo canceller that utilizes knowledge of non-linear components in an echo path to pre-distort a received signal in amplitude prior to adaptive linear filtering.

Furthermore, what is needed is an apparatus and method for acoustic echo cancellation that compensates for phase misalignment between a microphone input signal and the output of an adaptive echo cancellation filter.

SUMMARY OF THE INVENTION

The present invention, among other applications, is directed to solving the above-noted problems and addresses other problems, disadvantages, and limitations of the prior art. The present invention provides a superior technique for performing near end acoustic echo cancellation in a communication device. In one embodiment, acoustic processing apparatus is provided. The apparatus includes a pre-processing component, a filter and a first signal processing component. The pre-processing component compensates a non-linearity of a reference signal to generate an input signal. The filter coupled to the pre-processing component, the filter executes filtering on the input signal to generate an output signal. The first signal processing component, coupled to the pre-processing component, the reference signal obtains a gain from the first signal processing component to generate a first signal, and the first signal processing component passes the gain to the pre-processing component.

One aspect of the present invention contemplates an acoustic echo cancellation apparatus. The apparatus has a pre-processing component, a filter, a signal processing component and a phase synchronization element. The pre-processing component compensates a non-linearity of a reference signal to generate an input signal. The filter is coupled to the pre-processing component. The filter executes filtering on the input signal to generate an output signal. The phase synchronization element is coupled to the pre-processing component. The reference signal obtaining a gain from the signal processing component to generate a first signal, and the signal processing component passing the gain to the pre-processing component. The phase synchronization element coupled to the output signal of the filter and to the first signal of the signal processing component, wherein the phase synchronization element aligns the output signal in phase with the first signal to generate a phase synchronizing signal.

Another aspect of the present invention comprehends an audio processing method. The method includes Compensating a non-linearity of a reference signal, by a pre-processing component, to generate an input signal, and executing filtering on the input signal, by a filter, to generate an output signal, wherein the reference signal obtains a gain from a first signal processing component to generate a first signal, and the first signal processing component passes the gain to the pre-processing component.

Regarding industrial applicability, the present invention is implemented within a CELLULAR TELEPHONE.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on near end acoustic echo cancellation and associated techniques employed within present day cellular telephones and like devices to preclude transmission of near end echoes, a discussion of the limitations and disadvantages of these present day techniques will now be discussed with reference to FIGS. 1-2. Following this, and discussion of the present invention will be provided with reference to FIGS. 3-4. The present invention provides and superior acoustic echo cancellation technique beyond that which heretofore has been provided by equipping a cellular telephone with an acoustic echo cancellation apparatus that takes into account non-linear aspects of an acoustic echo path including saturation effects and phase distortion.

Figure 1:
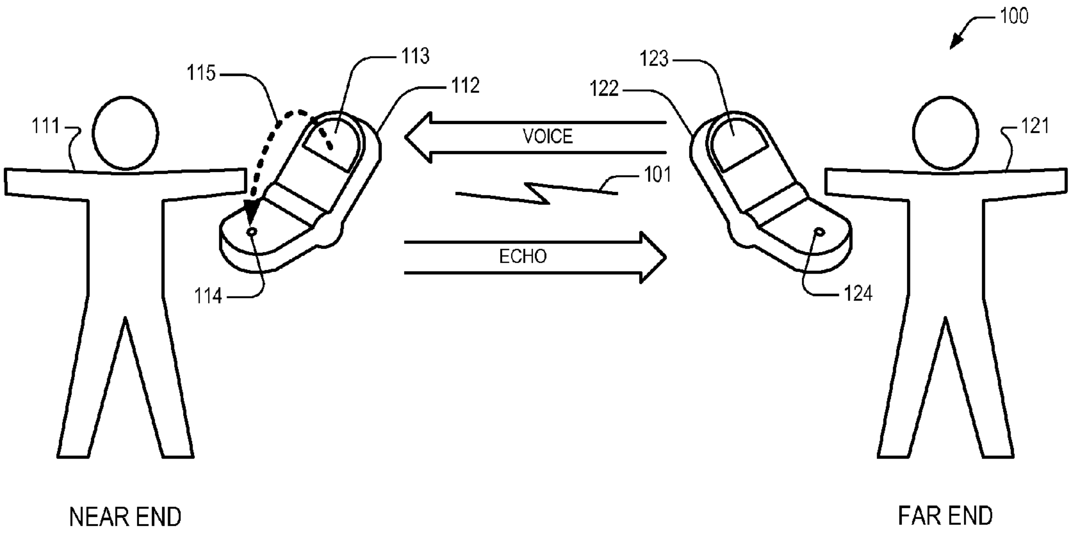
FIG. 1 (Prior Art)
FIG. 1 is a block diagram illustrating near end acoustic echo from the perspective of a present day cellular telecommunications session.

Turning to FIG. 1, a block diagram 100 is presented illustrating near end acoustic echo from the perspective of a present day cellular telecommunications session. The diagram 100 depicts a near end caller 111 employing a first mobile telephone 112 to communicate by voice with a far end caller 121. The call is placed over a conventional two-way wireless radio link 101 that couples the first mobile telephone 112 to a second mobile telephone 122 in possession of the far end caller 121.

The first phone 112 has a speaker 113 that generates audio representative of the voice of the far end caller 121, and a microphone 114 into which the near end caller 111 speaks. The second phone 122 has a speaker 123 that generates audio representative of the voice of the near end caller 111, and a microphone 124 into which the far end caller 121 speaks. As one skilled in the art will appreciate, virtually all present data mobile phones 112, 122 can be placed in a loudspeaker mode whereby the callers 111, 121 are not required to hold their phones 112, 122 next to their ears in order to hear received audio. For some phones 112, 122, activation of loudspeaker mode results in an increase in volume of the speaker 112, 123. Other phones may have a separate speaker that is activated. For purposes of this application, a single speaker 113, 123 is depicted, but it is noted that such a configuration is provided to teach the present invention, and the scope of the present invention extends to phones having multiple speakers as well.

Consider the situation where the far end caller 121 is talking Signals representative of the caller's voice are transmitted over the wireless link 101 to the near end phone 112. These received signals are processed by the near end phone 112 and are broadcast through the near end speaker 112 as acoustic signals representative of the far end caller's voice. Acoustic echo is a phenomenon that occurs when sound that is broadcast through the speaker 113 is picked up by the near end microphone 114, is processed and transmitted back over the wireless link 101 by the near end phone 112, is received and processed by the far end phone 122, and is broadcast through the far end speaker 122. Hence, the far end caller 121 hears an echo of his/her own voice.

Although it is understood that acoustic echo can develop at either the near end or far end of a call, detection and cancellation of echo is performed by the phone 112 that would otherwise transmit these undesirable signals. In the case shown in the diagram 100, acoustic echo cancellation is performed by the near end phone 112. As one skilled in the art will appreciate, both phones 112, 122 are required to provide for acoustic echo cancellation in order to achieve a comfortable conversation between the callers 111, 121, however, for purposes of teaching the present invention, echo detection cancellation is presented from the perspective of a near end phone 112.

Accordingly, it is desirable that the near end phone 112 detects and cancels out any signals associated with near end echo so that they are not transmitted back to the far end phone 122 over the cellular link 101. Virtually all present day cellular telephones 112, 122 provide signal processing to detect and cancel acoustic echo, an example of which will now be discussed with reference to FIG. 2.

Figure 2:
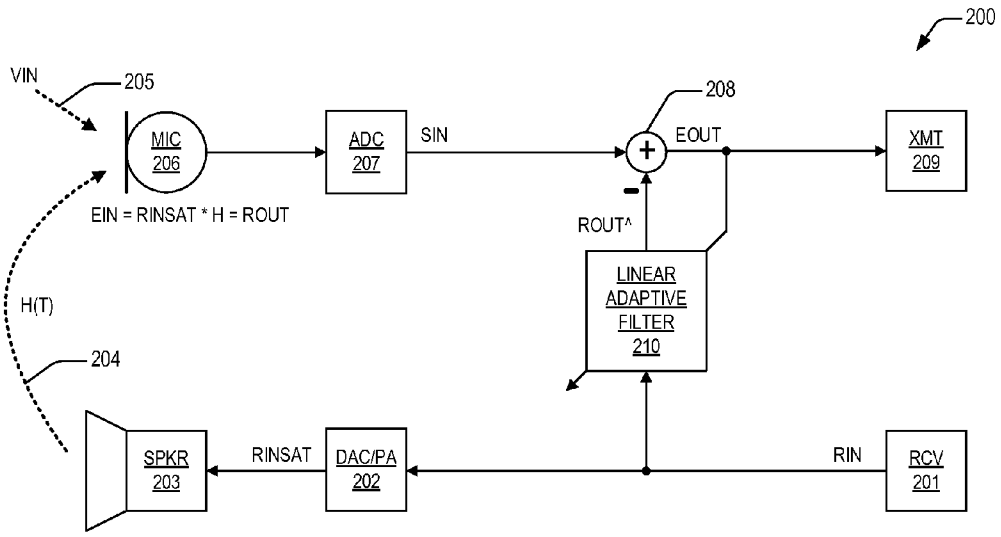
FIG. 2 (Prior Art)
FIG. 2 is a block diagram depicting a present day acoustic echo cancellation technique employed in a convention mobile phone.

FIG. 2 is a block diagram 200 depicting a present day acoustic echo cancellation technique employed in a convention mobile phone, such as the near end phone 112 of FIG. 1. The diagram 200 shows a receiver processing element 201 that processes electrical signals received over a cellular link (not shown) that are transmitted by a far end phone (not shown). The receiver 201, among other functions, converts the received signals to a digital form suitable for digital processing, as represented by signal RIN. Signal RIN is provided to a digital-to-analog converter (DAC) and power amplification (PA) element 202 and also to a linear adaptive filter 210. The DAC/PA 202 generates an analog signal RINSAT, which drives a speaker 203.

The speaker 203 is coupled via an acoustic echo channel 204 having an impulse response H(T) to a microphone 206. Accordingly, an echo signal EIN can be modeled as ROUT, which is RINSAT convolved with the impulse response H of the echo channel. A caller (not shown) also inputs speech VIN to the microphone 206 via an acoustic speech channel 205. Echo EIN or speech VIN, or both EIN, VIN are converted by the microphone 206 into electrical inputs to an analog-to-digital converter (ADC) 207, which generates a composite digital signal SIN. SIN is provided to a summation element 208.

The adaptive filter 210 periodically generates an estimated echo signal ROUT^, which is provided to the negative input of the summation element 208. The output of the summation element 208 is an error output EOUT, which is fed back to the adaptive filter 210 and which also is provided to a transmission processor 209. The transmission element 209 generates a transmit signal (not shown), which is transmitted over the cellular link (not shown) to the far end phone.

Operationally, it is desirable to minimize the error signal EOUT so that no echo is transmitted back to the far end phone. Accordingly, the adaptive filter 210 executes periodically when no voice signal VIN is present to generate the estimated echo signal ROUT^, which is subtracted from the composite signal SIN in order to generate the error signal EOUT. The adaptive filter 210 also evaluates the error signal EOUT to determine if it is below a specified threshold of acceptability. If not, then the filter 210 continues to execute to allow generated filter coefficients to converge until the error signal EOUT is acceptable. Thus, acoustic echo is cancelled out, or is at least minimized.

As one skilled in the art will appreciate, the filter 210 is enabled to execute only when there is no voice input VIN, that is, when VIN is equal to 0, and when there is a received signal RIN, that is, when RIN is not equal to 0. Since the filter 210 only has access to the composite signal 207 there are a few techniques within the art that are applied in a conventional cell phone to determine whether SIN consists of voice only, echo only, or both (so called "doubletalk" case). These techniques generally correlate or compare samples of SIN with samples of RIN. Typically, the filter is scheduled to execute on a frame basis, say at 10 or 20 millisecond intervals, when it is determined that SIN consists only of echo. Thus, the adaptive filter 210 is configured to model the transfer function of the acoustic echo channel. As coefficients calculated by the filter converge, near end acoustic echo cancellation is purportedly achieved. There are numerous adaptive algorithms that are employed within the art to generate filter coefficients for echo cancellation, but the present inventors note that virtually all of these algorithms are variations of the well known Least Mean Squares (LMS) algorithm that estimates a desired filter response (e.g., H(T)) by generating filter coefficients that relate to producing the least mean squares of the error signal EOUT.

Such is the state of the art in most conventional cellular devices. The present inventors have however observed that acoustic echo cancellation techniques as described above are lacking because they all assume a linear systems model of the echo channel and of elements of the cell phone, and as one skilled in the art will appreciate, there a numerous non-linear elements therein which contribute to degradation of the echo cancellation process. For example, all cell phones operate on low voltage battery power which frequently causes distortion of the received signal RIN as it is amplified by the DAC/PA 202. Hence the analog received signal RINSAT is most often not a pure sine wave, but a clipped sine wave due to saturation of the DAC/PA 202 when RIN exceeds a threshold. Lesser degrees of amplitude distortion are introduced by the speaker 203 and the microphone 206. Another major non-linear contribution is due to latencies in the echo path 204, thus shifting the phase of SIN relative to RIN.

The above examples are the prevalent, but not exclusive, contributors to non-linear distortion of the received signal RIN, upon which the linear filter 210 operates to generate an estimated echo signal ROUT^. Stated differently, the filter 210 estimates ROUT^ based upon the assumption that EIN is a linear transformation of RIN—which is not the case because of amplitude and phase distortion as noted above. Thus, the present inventors have noted that conventional acoustic echo cancellation techniques are disadvantageous, resulting in substandard connections between callers which are laced with residual echo effects.

The present invention overcomes the above noted limitations, and others, by providing an acoustic echo cancellation mechanism for use in a cell phone or similar device that addresses non-linear perturbations of a received signal RIN, both in amplitude and in phase. The present invention will now be described with reference to FIGS. 3-4.

Figure 3:
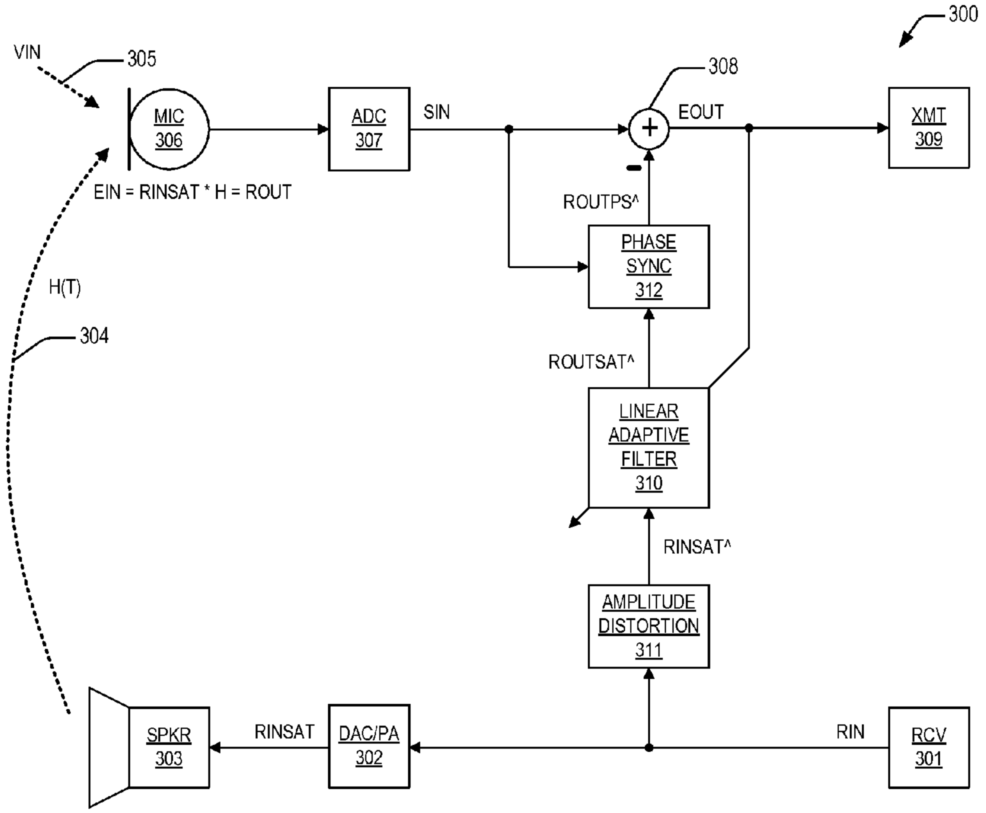
FIG. 3 is a block diagram featuring an echo path compensation apparatus for acoustic echo cancellation according to the present invention.

Turning to FIG. 3, a block diagram 300 is presented featuring an echo path compensation apparatus 300 for acoustic echo cancellation according to the present invention. The apparatus 300 includes a receiver processing element 301 that processes electrical signals received over a cellular link (not shown) that are transmitted by a far end phone (not shown). The receiver 301, among other functions, converts the received signals to a digital form suitable for digital signal processing, as represented by signal RIN. Signal RIN is provided to a digital-to-analog converter (DAC) and power amplification (PA) element 302 and obtains a gain therefrom. Signal RIN is also provided to an amplitude distortion element 311. The amplitude distortion element 311 is coupled to the DAC/PA 302 to get the gain therefrom, and also coupled to a linear adaptive filter 310. The DAC/PA 302 generates an analog signal RINSAT, which drives a speaker 303. The linear adaptive filter 310 generates an estimated amplitude-saturated received signal ROUTSAT^ which is coupled to a phase synchronization element 312. The phase synchronization element 312 generates a phase shifted echo patch signal ROUTPS^, which is routed to the negative input of a summation block 308.

The speaker 303 is coupled via an acoustic echo channel 304 having an impulse response H(T) to a microphone 306. Accordingly, an echo signal EIN is modeled as ROUT, which is RINSAT convolved with the impulse response H of the echo channel. A caller (not shown) inputs speech VIN to the microphone 306 via an acoustic speech channel 305. Echo EIN or speech VIN, or both EIN, VIN are converted by the microphone 306 into electrical inputs to an analog-to-digital converter (ADC) 307, which generates a composite digital signal SIN. SIN is provided to the positive input of the summation element 308.

In contrast to a present day echo cancellation mechanism, such as is described above with reference to FIG. 2, the echo path compensation apparatus 300 according to the present invention includes the amplitude distortion element 311 that pre-conditions the amplitude of signal RIN based upon known parameters of the non-linear elements of the system including, but not limited to, the DAC/PA 302, the speaker 303, the echo patch 304, and the microphone 306. As is alluded to above, many of the non-linear effects introduced by elements in the echo system result in distortion of the amplitude of the received signal RIN, most notably of which is clipping due to saturation of one or more elements. Accordingly, the amplitude distortion element 311 employs a priori knowledge of the above noted elements to introduce amplitude distortion into RIN in order to generate an estimated amplitude-saturated echo signal RINSAT^, which is approximately equivalent to signal RINSAT.

The adaptive filter 310 periodically generates an estimated amplitude-saturated echo signal ROUTSAT^, which is routed to a phase synchronization element 312. In one embodiment, the adaptive filter 310 comprises a finite impulse response filter 310 which adaptively models the complete electro-mechanical-acoustical impulse response of the echo path 304. In one embodiment, the filter 310 utilizes a variation of the Least Mean Squares (LMS) algorithm to compute the filter coefficients. Another embodiment contemplates use of Recursive Least Squares (RLS). A further embodiment utilizes the Affine Projection (AP) algorithm, or any other linear adaptive algorithm known to those in the art.

The composite signal SIN is also provided to the phase synchronization element 312. The synchronization element 312 generates an estimated echo signal ROUTPS^ that is synchronized in phase to the composite signal SIN. The output of the summation element 308 is an error output EOUT, which is fed back to the adaptive filter 310 and which also is provided to a transmission processor 309. The transmission element 309 generates a transmit signal (not shown), which is transmitted over the cellular link (not shown) to the far end phone.

The echo cancellation mechanism 300 operates to minimize the error signal EOUT so that no echo is transmitted back to the far end phone. Accordingly, the adaptive filter 310 executes periodically when no voice signal VIN is present to generate the estimated echo signal ROUTPS^, which is subtracted from the composite signal SIN in order to generate the error signal EOUT. The adaptive filter 310 also evaluates the error signal EOUT to determine if it is below a specified threshold of acceptability. If not, then the filter 310 continues to execute to allow generated filter coefficients to converge until the error signal EOUT is acceptable. In contrast to a conventional echo cancellation mechanism, such as is described above with reference to FIG. 2, the echo cancellation mechanism 300 according to the present invention performs the additional functions of introducing both amplitude and phase non-linear effects of the system 300 so that the resulting estimated echo signal ROUTPS^ is a significantly more accurate representation of the true echo signal ROUT, thus minimizing near end echo and producing a more comfortable sound at the far end.

In summary, a linear adaptive filter 310 is employed according to the present invention, however the received signal RIN is pre-conditioned in amplitude by the amplitude distortion element 311 to introduce known distortion that RIN will experience as it follows the echo patch 304. One embodiment contemplates an amplitude distortion element 311 that utilizes distortions that have been measured from exemplary elements within the echo path 304, such as the DAC/PA 302. In a clipping only embodiment, knowledge of the gain and saturation threshold of the DAC/PA 302 is programmed into the amplitude distortion element 311 such that when RIN exceeds the saturation threshold, the amplitude is held constant.

In one embodiment, the filter 310 is executes only when there is no voice input VIN, that is, when VIN is equal to 0, and when there is a received signal RIN, that is, when RIN is not equal to 0. Detection of this condition is determined by known methods as alluded to above. In one embodiment the filter 310 is scheduled to execute on a frame basis, 10 millisecond intervals, when it is determined that SIN consists only of echo. Thus, the adaptive filter 310 is configured to model the transfer function of the acoustic echo channel. As coefficients calculated by the filter converge, near end acoustic echo cancellation is purportedly achieved and more comfortable sound is produced at the far end over conventional cancellation schemes.

In addition to amplitude distortion effects, the present invention compensates for phase differences seen between the estimated amplitude-saturated received signal RINSAT^ and the composite signal SIN, where the phase of RINSAT^ is changed to synchronize with the phase of SIN. In one embodiment, the phase synchronization element 312 converts SIN to the frequency domain, then changes the phase of RINSAT^ (which is already in the frequency domain) accordingly, and then converts the resulting signal to generate ROUTPS^ in the time domain.

The echo cancellation mechanism 300 according to the present invention performs the functions and operations as described above. The mechanism 300 comprises logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the echo cancellation mechanism 300 may be shared with other circuits, microcode, etc., that are employed to perform other functions and/or operations within the a cellular device. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC). For a complex instruction set computer (CISC), complex instructions are translated into associated micro instructions, and the associated micro instructions are directly executed by a unit or units within the CISC.

Figure 4:
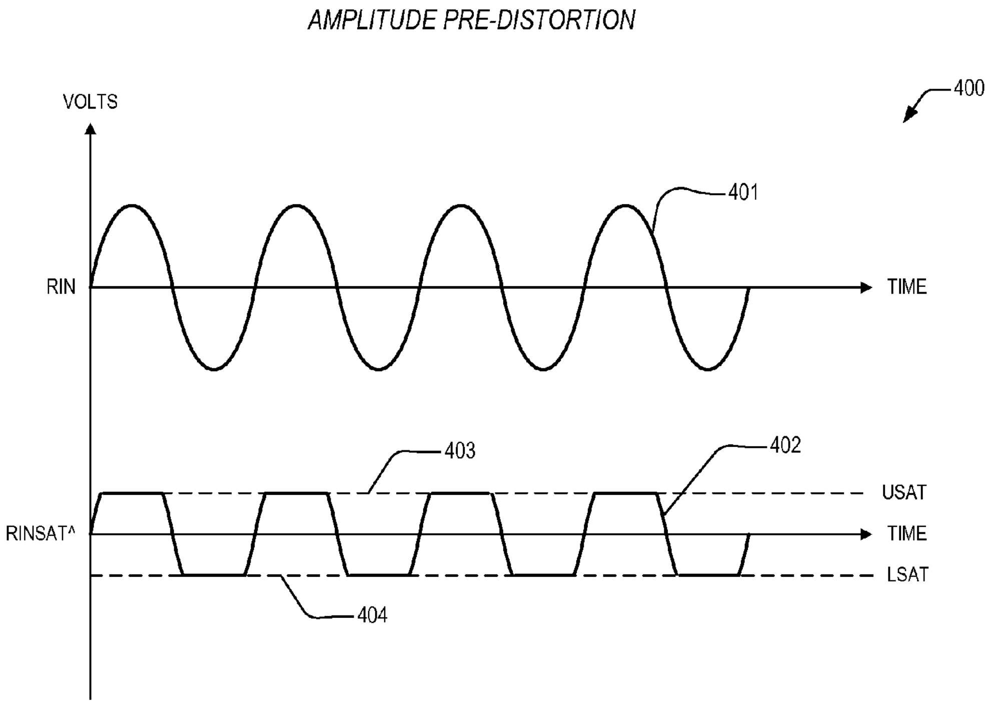
FIG. 4 is a timing diagram showing how amplitude predistortion is applied in the acoustic echo cancellation technique of FIG. 3.

Now referring to FIG. 4, a timing diagram 400 is presented showing how amplitude pre-distortion is applied in the acoustic echo cancellation technique of FIG. 3. The diagram 400 depicts two signals, RIN 401 and RINSAT^ 402. RIN is the digitized received signal output by the receiver processor 301, which is provided to the amplitude distortion element 311. RINSAT^ 402 is the estimated amplitude-saturated received signal that is generated by the amplitude distortion element 311 and which is provided to the adaptive filter 310. According to the embodiment shown in the diagram 400, when the amplitude of RIN exceeds an upper saturation threshold USAT 403, the amplitude is held at that level until RIN drops below USAT 403. When the amplitude of RIN drops below a lower saturation threshold LSAT 404, the amplitude is held by the distortion element 311 until RIN rises above LSAT 404. Accordingly, saturation effects on amplitude of RIN are modeled in the input waveform RINSAT^ to the adaptive filter 310. The saturation threshold and the DAC/PA gain is inverse property which means that the DAC/PA gain multiplying the saturation threshold is equal to a constant.

The present invention enhances the performance of a linear acoustic echo cancellation mechanism employed within a cell phone or like device to effectively cancel echo in a speaker-to-microphone path by applying a pre-distorted received reference signal to an adaptive filter, and by employing in-phase processing to the output of the adaptive filter. The pre-distorted amplitude of the reference signal compensates for non-linear characteristics of the echo path, and mitigates non-linear distortion of other elements in the system, while the in-phase process synchronizing the phase of a filtered signals to the composite microphone input signal.

Advantageously, the present inventors have observed that embodiments of the present invention have resulted in an average reduction in the error signal of approximately 2.5 decibels over that which has heretofore been provided due entirely to the introduction of amplitude pre-distortion based upon knowledge of the contributing elements in the system.

Likewise, by synchronizing the phase of the output of the adaptive filter, embodiments of the present invention provide for an additional reduction in the error signal of at least 3.0 decibels over conventional cancellation mechanisms.

Although the present invention and its objects, features, and advantages have been described in detail, other embodiments are encompassed by the invention as well. For example, the present invention has been primarily characterized in terms of a wireless cellular telecommunication device, or cell phone. However, the present inventors note that such a device is exemplary and has been employed in order to teach aspects of the present invention, and application of the present invention should not be restricted to cell phones only. Rather, any type of communication device such as, but not limited to, two-way radios, conventional telephone systems, paging devices, and the like all benefit from the mechanisms and methods as taught herein.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. An audio processing apparatus, comprising:

a first signal processing component, that introduces a gain into a reference signal to generate a first signal, wherein the first signal is directly coupled to a speaker in an acoustic path, wherein said first signal is clipped due to saturation of said first signal processing component when performing power amplification to introduce said gain;

a pre-processing component, coupled to the first signal processing component to get the gain, wherein the pre-processing component transforms said reference signal into a non-linear input signal by applying said gain to said reference signal, and wherein said non-linear input signal is also clipped to approximate said saturation, and wherein said pre-processing component is programmed with knowledge of said gain and saturation threshold of said first signal processing component, and wherein when said first signal exceeds said saturation threshold, said pre-processing component holds amplitude of said non-linear input signal constant; and a filter, coupled to the pre-processing component, that filters said non-linear input signal to generate an output signal.

2. The audio processing apparatus as recited in claim 1, wherein the pre-processing component is an amplitude distortion component that introduces amplitude distortion into the reference signal and clips the reference signal's amplitude at a threshold.

3. The audio processing apparatus as recited in claim 2, wherein the threshold level is inversely proportional to the gain.

4. The audio processing apparatus as recited in claim 1, further comprising:

a second signal processing component, operatively coupled to the first signal processing component, wherein the second signal processing component executes processing on a version of the first signal that is received through a microphone in the acoustic path to generate a second signal, and a phase synchronization element, coupled to the output signal of the filter and to the second signal of the second signal processing component, wherein the phase synchronization element aligns the output signal in phase with the second signal to generate a phase synchronizing signal.

5. The audio processing apparatus as recited in claim 4, further comprising:

a summation element, coupled to the phase synchronizing signal of the phase synchronization element and to the second signal of the second signal processing component, wherein the summation element subtracts the phase synchronizing signal from the second signal to generate a final signal.

6. The audio processing apparatus as recited in claim 5, wherein the final signal is fed back to the filter, and wherein the filter evaluates the final signal to decide whether to continue the execution.

7. The audio processing apparatus as recited in claim 1, wherein the filter is an adaptive filter that is designed for tracking an echo path impulse response.

8. The audio processing apparatus as recited in claim 1, wherein said filter executes on a frame basis when it is determined that a voice signal is not present.

9. The audio processing apparatus as recited in claim 1, wherein the audio processing apparatus is disposed within a cellular telecommunication device.

10. An acoustic echo cancellation apparatus, comprising:

a first signal processing component, that introduces a gain into a reference signal to generate a first signal, wherein the first signal is directly coupled to a speaker in an acoustic path, wherein said first signal is clipped due to saturation of said first signal processing component when performing power amplification to introduce said gain;

a pre-processing component, that transforms said reference signal into a non-linear input signal by applying said gain to said reference signal, wherein said non-linear input signal is also clipped to approximate said saturation, and wherein said pre-processing component is programmed with knowledge of said gain and saturation threshold of said first signal processing component, and wherein when said first signal exceeds said saturation threshold, said pre-processing component holds amplitude of said non-linear input signal constant;

a filter, coupled to the pre-processing component, that filters said non-linear input signal to generate an output signal; and a phase synchronization element, coupled to said output signal and to said first signal, wherein the phase synchronization element aligns the output signal in phase with the first signal to generate a phase synchronizing signal.

11. The acoustic echo cancellation apparatus as recited in claim 10, further comprising:

a summation element, coupled to the phase synchronizing signal of the phase synchronization element and to the first signal of the signal processing component, wherein the summation element subtracts the phase synchronizing signal from the first signal to generate a final signal.

12. The acoustic echo cancellation apparatus as recited in claim 11, wherein the final signal is fed back to the filter, and wherein the evaluates the final signal to decide weather to continue the execution.

13. An audio processing method, comprising:

first employing a first signal processing component to introduce a gain into a reference signal to generate a first signal, wherein the first signal is directly coupled to a speaker in an acoustic path, wherein the first signal is clipped due to saturation of the first signal processing component when performing power amplification to introduce the gain;

second employing a pre-processing component to transform the reference signal into a non-linear input signal by applying the gain to the reference signal, wherein the non-linear input signal is also clipped to approximate the saturation, and wherein said pre-processing component is programmed with knowledge of said gain and saturation threshold of said first signal processing component, and wherein when the first signal exceeds said saturation threshold, the pre-processing component holds amplitude of said non-linear input signal constant; and coupling a filter to the pre-processing component, and filtering the non-linear input signal to generate an output signal.

14. The audio processing method as recited in claim 13, wherein the pre-processing component is an amplitude distortion component that introduces amplitude distortion into the reference signal and clips the reference signal's amplitude at a threshold level.

15. The audio processing method as recited in claim 14, wherein the threshold level is in inversely proportional to the gain.

16. The audio processing method as recited in claim 13, further comprising:

executing processing on the first signal, by a second signal processing component to generate a second signal; and aligning the output signal in phase with the second signal, by a phase synchronization element, to generate a phase synchronizing signal;

wherein, the second signal processing component is coupled to the first signal processing component, and the phase synchronization is coupled to the output signal of the filter and to the second signal of the second signal processing component.

17. The audio processing method as recited in claim 16, further comprising:

subtracting the phase synchronizing signal from the second signal, by a summation element, to generate a final signal, wherein the summation element is coupled to the phase synchronizing signal of the phase synchronization element and to the second signal of the second signal processing component.

18. The audio processing method as recited in claim 17, wherein the final signal is fed back to the filter, and wherein the filter evaluates the final signal to decide whether to continue the execution.

19. The audio processing method as recited in claim 13, wherein the filter is an adaptive filter that is designed for tracking an echo path impulse response.

20. The audio processing method as recited in claim 13, wherein the filter executes on a frame basis when it is determined that a voice signal is not present.

21. The audio processing method as recited in claim 13, wherein the audio processing apparatus is disposed within a cellular telecommunication device.

* * * * *